US008541682B2

(12) United States Patent
Mazelle et al.

(10) Patent No.: US 8,541,682 B2
(45) Date of Patent: Sep. 24, 2013

(54) DEVICE FOR SPACING ELECTRICAL HARNESSES IN A TURBOMACHINE

(75) Inventors: Christian Henry Mazelle, Saclay (FR); Guillaume Marcillaud, Thiais (FR)

(73) Assignee: SNECMA, Paris (FR)

( * ) Notice: Subject to any disclaimer, the term of this patent is extended or adjusted under 35 U.S.C. 154(b) by 85 days.

(21) Appl. No.: 13/276,714

(22) Filed: Oct. 19, 2011

(65) Prior Publication Data

US 2012/0097443 A1  Apr. 26, 2012

(30) Foreign Application Priority Data

Oct. 21, 2010  (FR) ...................... 10 58614

(51) Int. Cl.
*H02G 3/04* (2006.01)
*F16L 3/08* (2006.01)

(52) U.S. Cl.
USPC ..... 174/72 A; 174/68.1; 174/72 R; 174/88 R; 248/74.1; 248/74.2; 248/68.1

(58) Field of Classification Search
USPC .................. 174/19, 21 R, 481, 50, 520, 503, 174/60, 72 A, 72 R, 73.1, 74 R, 88 R, 95, 174/96, 40 CC, 68.1; 248/74.1, 74.2, 74.3, 248/49, 68.1, 63
See application file for complete search history.

(56) References Cited

U.S. PATENT DOCUMENTS

| | | | | |
|---|---|---|---|---|
| 3,894,706 A * | 7/1975 | Mizusawa | ..................... | 248/68.1 |
| 4,669,156 A * | 6/1987 | Guido et al. | ................. | 248/74.3 |
| 5,535,969 A * | 7/1996 | Duffy, Jr. | ..................... | 248/68.1 |
| 5,613,655 A * | 3/1997 | Marion | ........................ | 248/68.1 |
| 7,011,277 B2 * | 3/2006 | Mizukoshi et al. | .......... | 248/68.1 |
| 7,172,162 B2 * | 2/2007 | Mizukoshi et al. | .......... | 248/68.1 |
| 7,387,282 B2 * | 6/2008 | Kovac | .......................... | 248/74.4 |
| 7,533,852 B2 * | 5/2009 | Stigler | ......................... | 248/68.1 |
| 7,559,511 B2 * | 7/2009 | Yon | ............................... | 174/68.3 |
| 7,608,782 B2 * | 10/2009 | Hill | ............................. | 248/74.2 |

FOREIGN PATENT DOCUMENTS

FR    2906336 A1 *  3/2008

* cited by examiner

*Primary Examiner* — Angel R Estrada
(74) *Attorney, Agent, or Firm* — Oblon, Spivak, McClelland, Maier & Neustadt, L.L.P.

(57) ABSTRACT

A spacer device for spacing electrical harnesses in a turbomachine such as an airplane turboprop or turbojet is disclosed. The spacer device includes clips fastened on a support. A first clip is mounted on a harness via a retention device which prevents the spacer device from moving relative to the harness, and the spacer device includes a strip mounted around the first clip in order to close the first clip after a harness has been mounted in the first clip. The strip is fastened to the support in a non-releasable manner.

10 Claims, 2 Drawing Sheets

DEVICE FOR SPACING ELECTRICAL HARNESSES IN A TURBOMACHINE

FIELD OF THE INVENTION

The present invention relates to a device for spacing electrical harnesses in a turbomachine such as an airplane turboprop or turbojet.

BACKGROUND OF THE INVENTION

The casing of a turbomachine supports various pieces of equipment together with electrical harnesses, i.e. electric cables used for example to power the various pieces of equipment, such as a computer.

The positioning of the harnesses and the paths they follow along the casing are imposed by numerous constraints. Turbomachines present little available space for mounting such harnesses and the locations where the harnesses can be fastened are limited.

Furthermore, it is important to avoid any deterioration of the harnesses, in particular by abrasion due to the harnesses rubbing against one another or against portions of the turbomachine. Such abrasion can occur as a result of the turbomachine vibrating in operation, as a result of relative movements between the turbomachine and the nacelle in which it is mounted, or indeed as a result of manufacturing tolerances for the various parts situated close to the harnesses.

In order to avoid such abrasion, it is known to fit harnesses with spacer devices that are situated between two points where the harnesses are fastened, or that are situated at the fastening points. Such spacer devices are not themselves fastened to the casing and they serve solely for maintaining sufficient space between the harnesses to avoid them rubbing against one another, in particular in zones where it is difficult or impossible to fasten the harnesses.

Nevertheless, known devices cannot be positioned accurately and they are not mounted on the harnesses in captive manner.

OBJECT AND SUMMARY OF THE INVENTION

A particular object of the invention is to provide a solution to these problems that is simple, effective, and inexpensive.

To this end, the invention provides a spacer device for spacing electrical harnesses in a turbomachine, such as an airplane turboprop or turbojet, the device comprising clamping spring clips for clamping onto the harnesses, said clips being mounted spaced apart from one another on a common support, wherein a first clip is mounted on a harness via retention means for preventing the device from moving relative to the harness, and wherein the device includes a strip mounted around the first clip to close it once a harness has been mounted in the clip, the strip being fastened in non-releasable manner on said support.

The strip is thus fastened on the clip support and avoids the spacer device being lost, the distance between the clips being selected so as to avoid any rubbing between the harnesses. The retention means serve to position the spacer device accurately on the corresponding harness and to keep it in the selected position over time.

According to another characteristic of the invention, the strip comprises a U-shaped middle portion surrounding the first clip and two tabs formed at the ends of the U-shape and fastened to the above-mentioned support by rivets or by spot-welds.

Rivets or spot-welds constitute non-releasable fastener means that do not allow the strip to be removed other than by destroying it or the rivets.

According to yet another characteristic of the invention, the retention means comprise a sheath of plastics material surrounding the harness and having the clip mounted thereon, the sheath advantageously being made of heat-shrink material.

The sheath may thus be threaded over an end of the harness and positioned accurately on the harness, after which it may be heated so as to be mechanically bonded on the harness.

In a preferred embodiment, the support is a plane or bent strip of rectangular shape.

Preferably, the first clip is fastened to a middle portion of the support.

The other clips are fastened to the support and/or to the strip for closing the first clip.

The invention also provides a turbomachine such as an airplane turboprop or turbojet including a casing having electrical harnesses fastened thereon, wherein the harnesses are fitted with at least one spacer device of the above-specified type.

Preferably, the spacer device is mounted on the harnesses between two points where they are fastened to the casing.

BRIEF DESCRIPTION OF THE DRAWINGS

The invention can be better understood and other details, characteristics, and advantages of the invention appear on reading the following description made by way of non-limiting example with reference to the accompanying drawings, in which.

MORE DETAILED DESCRIPTION

Figure 1:
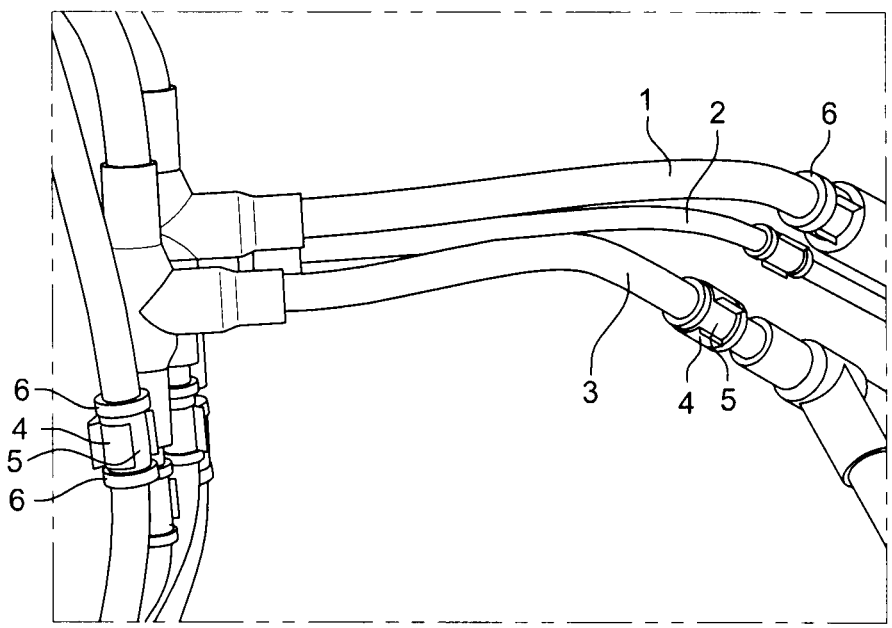
FIG. 1 is a fragmentary perspective view of a prior art turbomachine harness.

FIG. 1 shows harnesses 1, 2, 3 mounted on a turbomachine casing (not shown) in accordance with the prior art. Each harness 1, 2, 3 is fastened to the casing at a plurality of points by means of clamping spring clips 4 and via sheaths 5, also referred to as bobbins, that are mounted in fixed positions around the harnesses 1, 2, 3.

The spring clips 4 are fastened to the casing via their bases and they are open on their sides facing away from the casing. Each clip 4 is lyre-shaped and serves to hold the corresponding harness 1, 2, 3 in place after it has been inserted therein, by clamping onto the harness.

Each sheath 5 has two outwardly-projecting rims 6, one at each end, serving to form abutments that come into contact with the free edges of the spring clips 4 in the event of the harnesses 1, 2, 3 sliding in the clips 4.

The harnesses 1, 2, 3 can thus be positioned accurately relative to the casing via their zones for fastening to the casing.

However, as mentioned above, locations where clips 4 can be fastened to the casing are limited. If the fastening zones are too far apart from one another, then rubbing can occur between the harnesses themselves, between the harnesses and the casing, or between the harnesses and equipment fastened to the casing, thereby damaging the harnesses.

Figure 2:
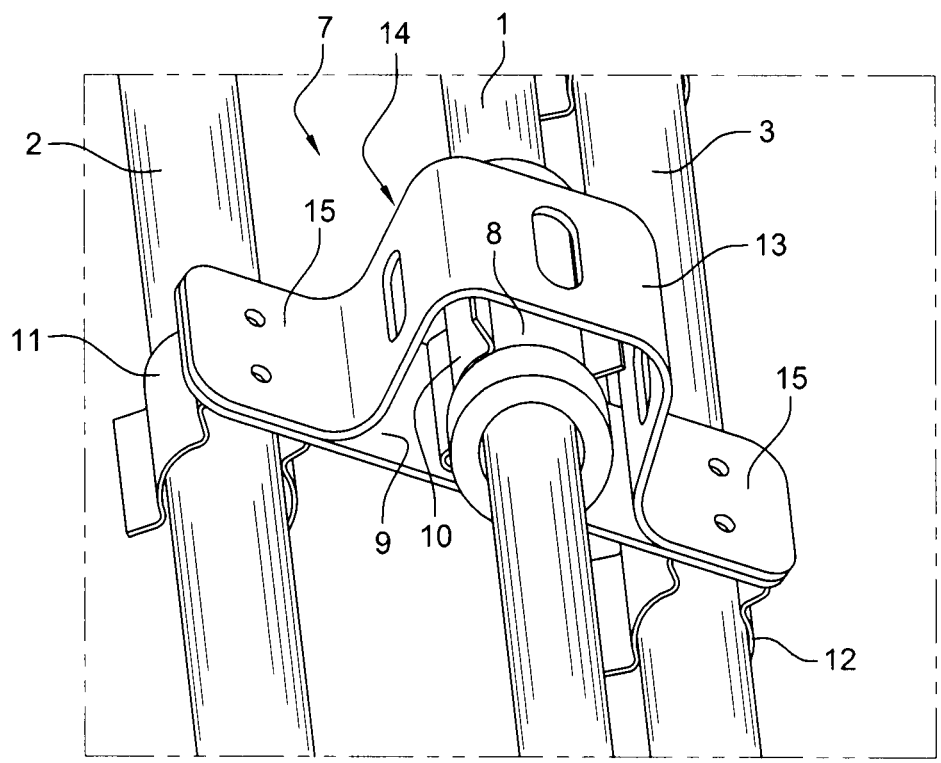
FIG. 2 is an enlarged perspective view showing how a harness spacer device in a first embodiment of the invention is mounted.

In order to avoid that, and as shown in FIG. 2, the invention proposes fitting the harnesses 1, 2, 3 with spacer devices 7 that are situated between the zones where they are fastened to the casing, in particular between zones that are very far apart, so as to maintain sufficient spacing between the harnesses 1, 2, 3 and prevent them being damaged by abrasion.

The zones the spacer devices 7 are mounted are identified accurately by means of sheaths 8 that are similar to the above-described sheaths 5 and that are mounted around the harnesses. Each sheath 8 is positioned on an end of a harness and is then fastened thereto. To do this, the sheaths 8 are advantageously made of a heat-shrink plastics material. Under such circumstances, the sheaths 8 are threaded onto the harnesses via one end thereof, put accurately into position, and then heated so as to become mechanically bonded thereto. In a variant, the sheaths 8 may be adhesively bonded to the harnesses.

Figure 3:
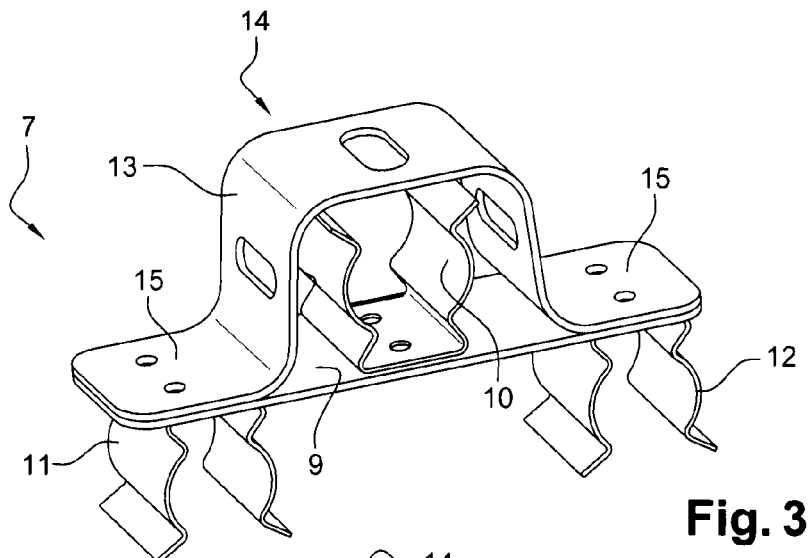
FIG. 3 is a perspective view of the FIG. 2 spacer device.

A first embodiment of the spacer device of the invention is shown in FIGS. 2 and 3. This device comprises a plane metal support 9, here formed by a generally rectangular strip, with three clamping spring clips 10, 11, 12 mounted thereon.

In particular, a first clip 10 is mounted in a middle zone of the support 9 on a first face thereof while the other two clips 11 and 12 are mounted near the ends of the support 9, on its other face. Each clip 10, 11, 12 is in the form of a resilient lyre of structure that is known in particular from document FR 2 906 336.

The clips 10, 11, 12 are fastened to the support 9 by spot-welding, riveting, or any other known means.

The spacer device 7 also includes a strip 13 that is mounted on the support 9 around the first clip 10 in order to close it after the harness 1 has been mounted on said clip. The strip 13 has a U-shaped middle portion 14 surrounding the first clip and two tabs 15 projecting from the ends of the U-shape and fastened to the above-mentioned support by rivets, spot-welding, or any other non-releasable fastener means. The middle portion 14 may include oblong openings serving to reduce the weight of the device 7. Such weight saving may also be obtained by forming ribs on the middle portion 14 by coining.

The spacer device 7 is mounted on the harnesses 1, 2, 3 as follows.

After a sheath 8 has been fastened on the harness 1, the harnesses 1, 2, 3 are inserted in the clamping spring clips 10, 11, 12 so as to be held apart by means of the support 9, and the strip 13 is put into position on the support 9 in such a manner as to surround the first harness 1 and close the first clip 10, after which it is fastened to the support 9 in non-releasable manner via its tabs 15. The spacer device 7 is thus fastened in captive manner on the harness 1 and it is held by the sheath 8 in the desired position on the harness.

Figure 4:
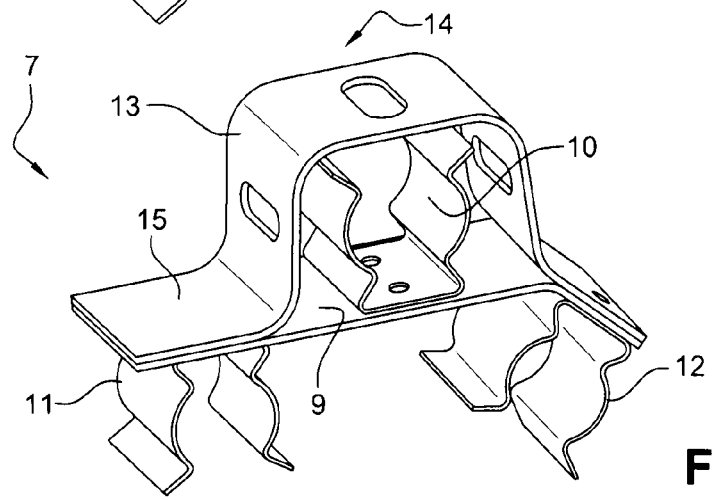
FIGS. 4 and 5 are perspective views of second and third embodiments of the invention, respectively.

FIG. 4 shows a second embodiment in which the support 9 has a bent end carrying the clip 12 and forming an angle relative to the middle portion, and to the other end of the support 9 that carries the clips 10 and 11. The shape of the strip 13 is also modified so that its tabs 15 match the ends of the support 9.

Figure 5:
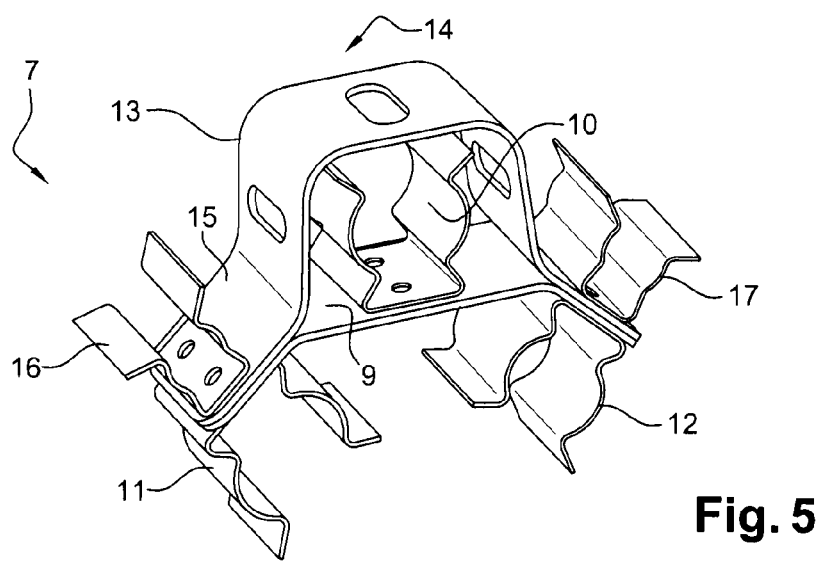

FIG. 5 shows another variant embodiment in which both ends of the support 9 are bent. The shape of the strip 13 is likewise adapted so that the tabs 15 match the bent ends of the support 9.

In this embodiment, two spring clips 16 and 17, similar to the above-described spring clips 10, 11, 12 but suitable for fastening harnesses of smaller diameters, are fastened on the tabs 15 of the strip 13, on the sides thereof that are opposite from the clips 11 and 12, respectively.

Naturally, the number of clips and the shape of the support 9 and of the strip 13 could be modified without going beyond the ambit of the invention. Thus, specifically, the spacer device 7 could have only two clips and/or the strip 13 could cover more than one harness and close more than one clip.

What is claimed is:

1. A spacer device for spacing electrical harnesses in a turbomachine, the device comprising:
    clamping spring clips for clamping onto the harnesses, said clips being mounted spaced apart from one another on a common support,
    wherein a first clip is mounted on a first harness via retention means for preventing any translation of the device with respect to the first harness, and
    wherein the device includes a strip mounted around the first clip to close the first clip once the first harness has been mounted in the first clip, the strip being fastened in a non-releasable manner on said support.

2. A device according to claim 1, wherein the strip comprises a U-shaped middle portion surrounding the first clip and two tabs formed at ends of the U-shape and fastened to the support by rivets or by spot-welds.

3. A device according to claim 1, wherein the retention means comprise a sheath of plastics material surrounding the harness and having the first clip mounted thereon.

4. A device according to claim 3, wherein the sheath is made of heat-shrink material.

5. A device according to claim 1, wherein the support is a plane or bent strip of rectangular shape.

6. A device according to claim 1, wherein the first clip is fastened to a middle portion of the support.

7. A device according to claim 1, wherein the other clips are fastened to one of the support or the strip for closing the first clip.

8. A turbomachine including a casing having electrical harnesses fastened thereon, wherein the harnesses are fitted with at least one spacer device according to claim 1.

9. A turbomachine according to claim 8, wherein the spacer device is mounted on the harnesses between two points where the harnesses are fastened to the casing.

10. A device according to claim 1, wherein the first clip is mounted on a first face of the support and the other clips are mounted on a second face of the support opposite the first face of the support.

* * * * *